UNITED STATES PATENT OFFICE.

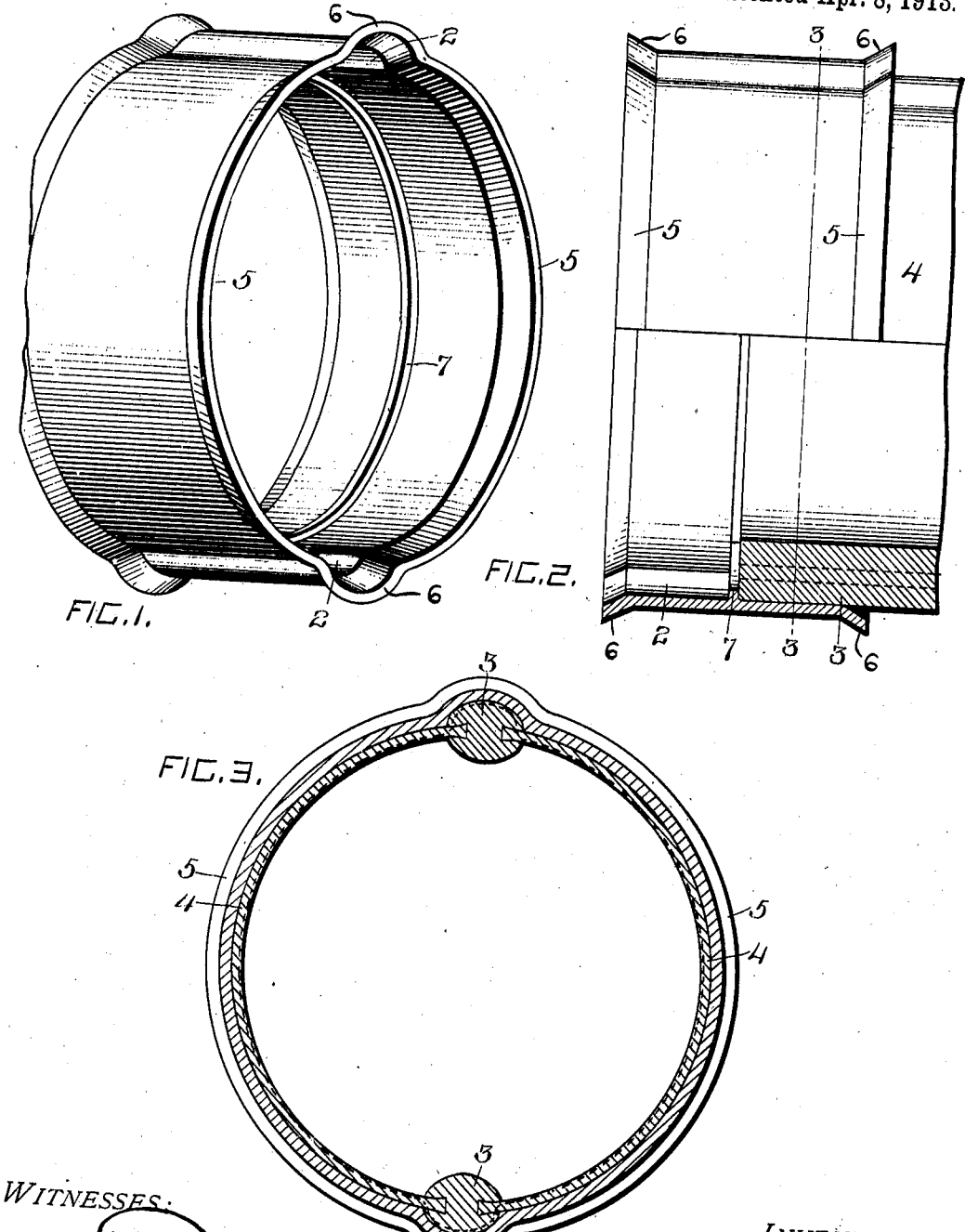

GEORGE P. BOOTHE, OF BRADFORD, PENNSYLVANIA, ASSIGNOR TO S. R. DRESSER MANUFACTURING COMPANY, OF BRADFORD, PENNSYLVANIA.

RUBBER-PACKED COUPLING FOR LOCK-BAR PIPE.

1,058,683.   Specification of Letters Patent.   Patented Apr. 8, 1913.

Application filed October 14, 1909. Serial No. 522,652.

*To all whom it may concern:*

Be it known that I, GEORGE P. BOOTHE, citizen of the United States, residing at Bradford, in the county of McKean and State of Pennsylvania, have invented certain new and useful Improvements in Rubber-Packed Couplings for Lock-Bar Pipe; and I do hereby declare the following to be a full, clear, and exact description of the invention, such as will enable others skilled in the art to which it appertains to make and use the same.

This invention consists in the novel features hereinafter described reference being had to the accompanying drawing, which illustrates the best form in which I have contemplated embodying my invention and said invention is fully disclosed in the following description and claim.

In the drawings, Figure 1 represents a perspective view of a middle ring for a lock bar pipe coupling, embodying my invention. Fig. 2 is a sectional elevation, of the same showing the end of a lock bar pipe section fitting within the same, and Fig. 3 is a transverse section on line 3—3 of Fig. 2.

In the manufacture of lock-bar pipe, plates of wrought metal are prepared of a length equal to the pipe section to be made therefrom and having their longitudinal edges trued so as to be parallel, and upset to give the plate a greater thickness at the extreme edge. The simplest form of the lock bar pipe, which is employed for the smaller sizes is made by bending or rolling the plate into nearly a tubular or cylindrical form, and introducing the meeting upset edges into grooves formed on opposite sides of a bar, the walls of the grooves in the bar being then compressed by hydraulic pressure or otherwise upon the upset edges of the plate, thus completing the pipe. In making larger sizes of lock bar pipe, two such plates are employed each being bent into nearly semi-cylindrical form, and having their edges connected by two lock bars as shown in the accompanying drawings. Larger sizes of lock-bar pipe are also made by employing a larger number of plates and a corresponding number of lock bars. It will be seen that the pipe sections so made are not truly circular in cross section, as the lock bars project beyond both the outer and inner walls of the pipe, and therefore, the ordinary pipe couplings cannot be employed for connecting them.

Referring to the drawings, the middle ring or sleeve which forms the subject matter of the invention is illustrated in perspective in Fig. 1. The said ring 1, is formed of wrought metal, as wrought iron or steel, and is preferably formed from a flat plate of a length substantially equal to the periphery of the ring, which is bent into ring form after which the ends are welded together. The ring 1 is preferably made of slightly larger diameter than the pipe sections with which it is to be used, and is given its final shape in suitable dies or molds which reduce the main diameter of the ring to conform to the pipe sections with which it is to be used, and form the surplus material in the ring into a longitudinally extending groove or grooves 2, to fit over the outer surfaces of the lock bar 3, on the pipe sections 4, the number of said grooves 2 being determined by the number of lock bars on the pipes with which it is to be used. The ring 1 is also provided at each end with an outwardly flared marginal portion 5, to form a packing recess, and the said outwardly flared portions are each provided with an outwardly curved portion 6 eccentric to the main portions thereof in line with the ends of the longitudinal groove or grooves 2.

The ring 1 is also provided centrally on its interior with a centering stop against which the meeting ends of the pipe sections abut to center the ring over the joint and this centering stop is preferably in the form of an annular, inwardly extending flange 7, which follows the contour of the interior of the ring, and the grooved portions thereof, as shown. I may, however, form a centering stop within the ring, in other ways. This stop is used in conjunction with packing rings (of rubber or other suitable material), clamping rings and bolts connecting the same, for connecting the meeting ends of two sections of lock-bar pipe, and it will be seen that it accommodates the lock bars of the pipe sections and provides a uniform packing recess at each end around the exterior of the pipe walls and the lock bars thereof.

What I claim and desire to secure by Letters Patent is:—

A wrought metal ring for a rubber packed pipe coupling for lock bar pipe, said ring having walls adapted to receive plain portions of the pipe and provided at each end with outwardly bent flanges to form packing recesses, said walls being compressed to a circle approximately the exterior of the plain pipe portions, surplus metal from the walls forming one or more grooves to receive the lock bar portion or portions of the pipe, and surplus metal from the flanges forming likewise a groove or grooves extending outwardly from the flanges.

In testimony whereof I affix my signature, in the presence of two witnesses.

GEORGE P. BOOTHE.

Witnesses:
M. E. CLARK,
H. M. WICK.